United States Patent
Wu

(10) Patent No.: US 6,654,094 B2
(45) Date of Patent: Nov. 25, 2003

(54) METHOD OF FABRICATING A LIQUID CRYSTAL DISPLAY WITH REDUNDANT INTERCONNECTIONS

(75) Inventor: Meng-Yueh Wu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 107 days.

(21) Appl. No.: 09/682,339

(22) Filed: Aug. 22, 2001

(65) Prior Publication Data

US 2002/0075421 A1 Jun. 20, 2002

(30) Foreign Application Priority Data

Dec. 15, 2000 (TW) .................................. 89126861 A

(51) Int. Cl.[7] ............................ G02F 1/13; G02F 1/136; H01L 29/04
(52) U.S. Cl. ........................ 349/187; 349/42; 349/43; 257/59; 257/72
(58) Field of Search ........................ 349/187, 42, 43; 257/59, 72

(56) References Cited

U.S. PATENT DOCUMENTS

| | | | | |
|---|---|---|---|---|
| 5,714,769 A | * | 2/1998 | Kim ........................... | 257/59 |
| 6,480,244 B2 | * | 11/2002 | Murade et al. ............... | 349/43 |
| 2002/0044231 A1 | * | 4/2002 | Yeo et al. ..................... | 349/43 |
| 2002/0093016 A1 | * | 7/2002 | Lim et al. .................... | 257/59 |
| 2002/0130324 A1 | * | 9/2002 | Song et al. ................... | 257/72 |
| 2002/0171083 A1 | * | 11/2002 | Lim et al. .................... | 257/59 |
| 2002/0171781 A1 | * | 11/2002 | Kim ............................. | 349/43 |

* cited by examiner

Primary Examiner—Tarifur R. Chowdhury
(74) Attorney, Agent, or Firm—Winston Hsu

(57) ABSTRACT

A method of fabricating a thin film transistor liquid crystal display (TFT-LCD) is provided. The TFT-LCD is formed on a substrate having a scan line and a signal line. The scan line and the signal line are perpendicular to each other and located on two different planes. The method includes the following steps: forming a passivation layer covering the thin film transistor and the signal line; patterning the passivation layer to form a signal line contact hole in the passivation layer above the signal line; forming a transparent conductive layer above the signal line and filling into the signal line contact hole; and then patterning the transparent conductive layer for remaining the transparent conductive layer located above a crossing region of the scan line and the signal line.

8 Claims, 4 Drawing Sheets

METHOD OF FABRICATING A LIQUID CRYSTAL DISPLAY WITH REDUNDANT INTERCONNECTIONS

BACKGROUND OF INVENTION

1. Field of the Invention

The present invention provides a method of fabricating a thin-film-transistor liquid-crystal-display (TFT-LCD), more particularly, a method of making the TFT-LCD by a five-masks process with redundant interconnections.

2. Background of the Invention

Due to the continued development and advancement in electrical technology, the range of application of a flat panel display is also increased. The kinds of the present flat panel display include liquid crystal displays (LCD), plasma display panels (PDP), electro-luminescent displays (ELD), field-emission displays (FED) light emitting diode displays (LED), and vacuum fluorescent displays (VFD).

A TFT-LCD usually includes a plurality of thin film transistors with a matrix structure, capacitors, and connecting pads to drive a plurality of liquid crystal pixels so as to generate color-rich graphics. A conventional LCD includes a transparent substrate having a matrix of thin film transistors, pixel electrodes, scan lines, signal lines, a color filter substrate, and a layer of liquid crystal materials positioned between the transparent substrate and the color filter substrate. Since the TFT-LCD is the advantages of lightweight, low energy consumption, and radiation free, it is employed in various portable electronic devices such as a notebook and PDA. Further, the TFT-LCD is slowly replacing the CRT of desktop computers.

Please refer to FIG. 1. FIG. 1 is a layout diagram of the conventional thin film transistor liquid crystal display (TFT-LCD) 10. The conventional TFT-LCD 10 is manufactured on a transparent glass substrate 11. As shown, on the glass substrate 11 are at least a thin film transistor(TFT) 40, a plurality of scan lines 12, and a plurality of signal lines 14 which are perpendicular to the scan lines 12. In the TFT-LCD 10, each thin film transistor 40 includes a gate electrode 42, a source 43, and a drain 44. Each TFT is used to drive a corresponding pixel electrode 16, which is made of indium tin oxide (ITO) layer, on the substrate 11. The gate electrode 42, usually made of polysilicon, is formed with the scan lines 12 at the same time. The source 42 and the drain 44 respectively connect with the pixel electrode 16 and the signal lines 14 via contact holes 46 and 48. For simplicity, other components of the TFT-LCD 10, such as the capacitor and connecting pad are omitted in FIG. 1.

According to the prior art, a redundant transparent conductive line 30 is formed to prevent short circuit of the signal lines 14. The redundant transparent conductive line 30 is formed above the signal line 14 and simultaneously formed with the pixel electrode 16. The transparent conductive line 30 is an ITO layer, and connects with the source electrode 43, drain electrode 44, and the signal line 14 through a source contact hole 46, a drain contact hole 48 and a signal line contact hole 52, respectively.

Usually, the signal lines 14 and the scan lines 12 are formed on different surfaces, this is to say, at least one layer is formed between the signal line 14 and the scan line 12, such as a semiconductor layer or an insulating layer. Hence, a short circuit may occur at the crossing region 32 of the signal lines 14 and scan lines 12 because the uneven surface of the intersection 32. To solve the problem, the ITO line 30 is formed over the signal line 14 to be a redundant line in the conventional method. The redundant line 30 can establish a connection with the signal line 14 via the signal line contact hole 52, so as to transmit the signal even a short circuit of the signal line 14 is happened at the crossing region 32.

However, the redundant ITO line 30 may be connected to the pixel electrode 16 because of the contaminants produced in the manufacturing process, resulting in a short circuit or a point defect, and the yield of the TFT-LCD 10 is reduced. In FIG. 1, the defect region marked by a dotted frame 50 represents the most likely region of the point defects. Thus, reducing the point defect is important in improving the yield of the TFT-LCD 10.

SUMMARY OF INVENTION

It is therefore a primary object of the present invention to provide a method of fabricating a thin film transistor liquid crystal display (TFT-LCD) to minimize the defect region, so as to increase the yield of the TFT-LCD.

DETAILED DESCRIPTION

Figure 2:
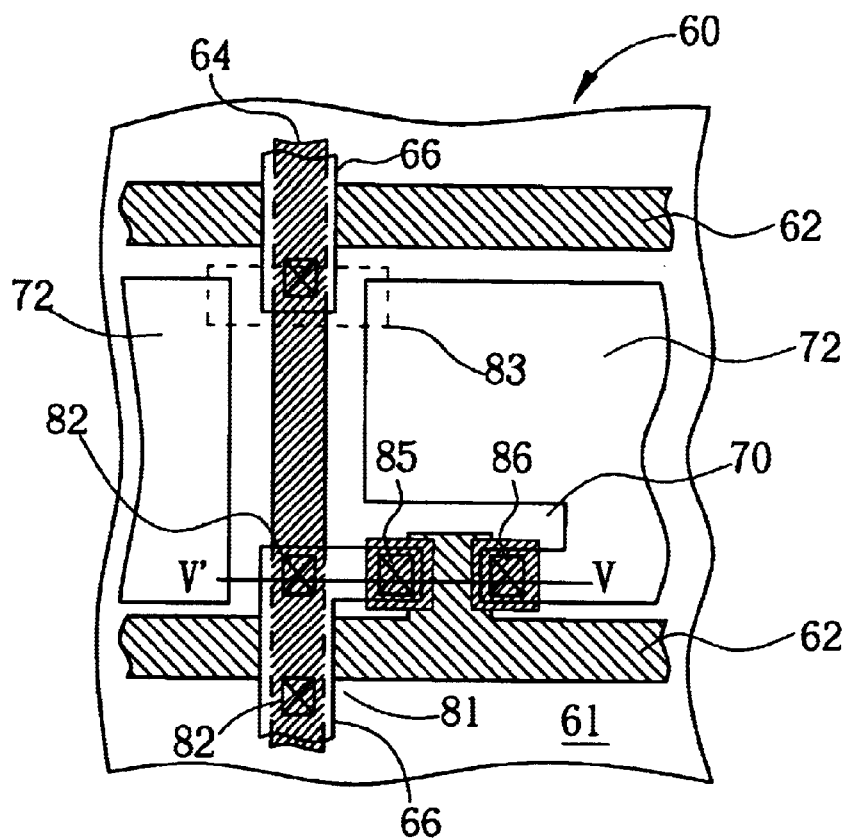
FIG. 2 is a layout diagram of the TFT-LCD according to the present invention.

Please refer to FIG. 2 of the layout diagram of the TFT-LCD 60 according to the present invention. Again, certain components of the TFT-LCD 60, such as the capacitor and the connecting pad, are omitted in FIG. 2 for simplicity. As shown here, the TFT-LCD 60 is formed on a transparent glass substrate 61. On the glass substrate 61, there are at least a thin film transistor 70, a plurality of scan lines 62, and a plurality of signal lines 64 which are perpendicular to and cross the scan lines 62. Each thin film transistor 70 is switching element for controlling the function of a pixel electrode 72. Usually, to pixel electrode is made of indium tin oxide (ITO). Above a crossing region 81 of the signal lines 64 and the scan lines 62, a redundant conductive line 66 is formed. The redundant conductive line 66 is also a localized ITO layer. Further, the redundant conductive line 66 is connected to the signal lines 64 via a signal contact hale 82, and connected to the thin film transistor 70 via a source contact hole 86 maid a drain contact hole 85.

Figure 1:
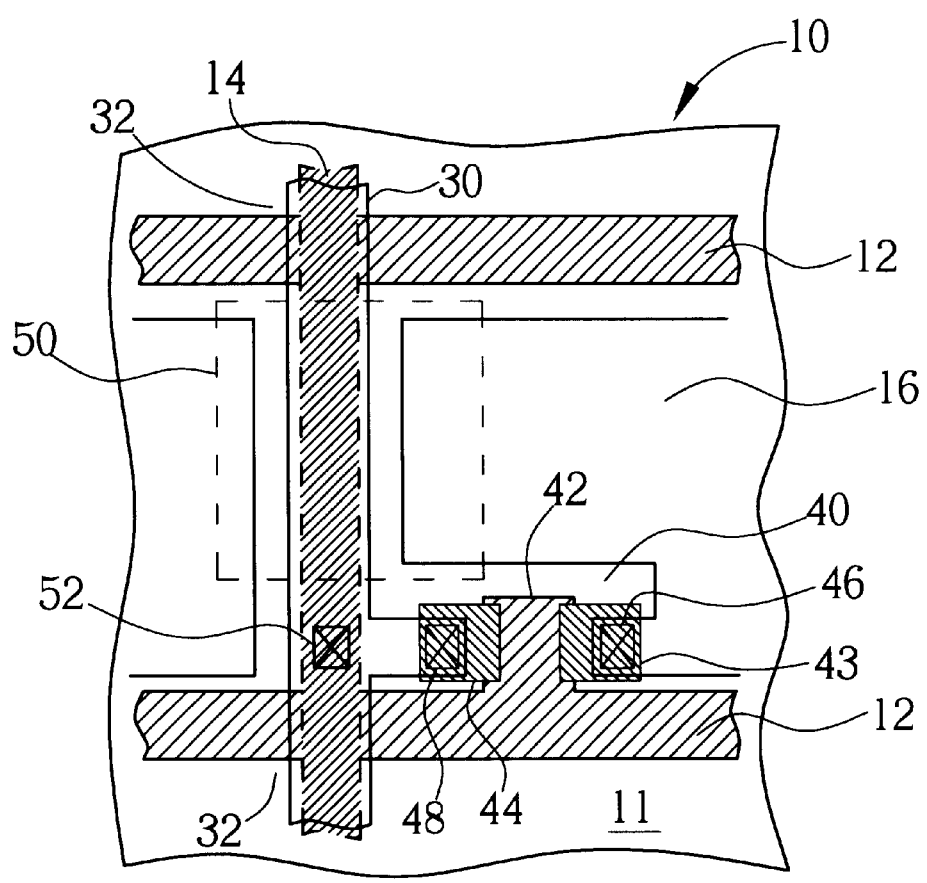
FIG. 1 is a layout diagram of the TFT-LCD according to the prior art.

The "localized" ITO layer means that the redundant conductive line 66 is formed only above the crossing region 81 rather than along the whole signal line 64. Besides, the signal line contact hole 82 is located at either sides of the crossing region 81 between the signal line 64 and the scan line 62 as shown in FIG. 2. The dotted frame 83 represents a high-frequent defect region, which defect means the short circuit between the redundant conductive line 66 and the pixel electrode 72 and caused by the particles formed during the fabricating proven. Compared to the defect region 50 marked by the dotted frame in FIG. 1, the high-frequent defect region 83 marked by the dotted frame in FIG. 2 is much smaller than the defect region 50 of the prior TFT-LCD. Thus, the probability of defect occurrence resulting from particles or metal contaminants is reduced.

Figure 3:
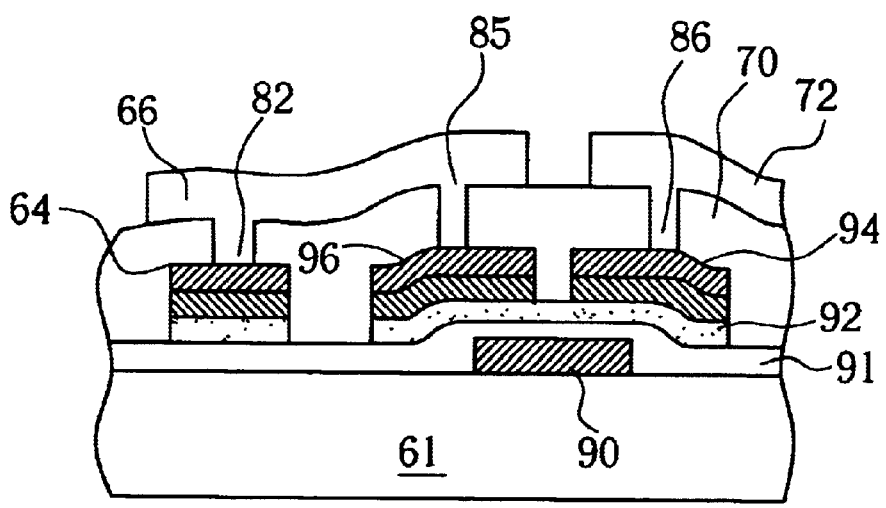
FIG. 3 is a cross-sectional view of the TFT-LCD along V–V" line of the FIG. 2 in the present invention.

Please refer to FIG. 3. FIG. 3 shows a partial cross-sectional view of FIG. 2 along the line V–V'. The TFT-LCD includes at least a thin film transistor 70 and a signal line 64. The thin film transistor 70 has a gate electrode 90 made by a first metal layer, a source electrode 94, and a drain electrode 96. The gate electrode 90 and the scan line 62 Coot shown in FIG. 3) are formed in the same process. Besides, the source electrode 94, the drain electrode 96, and the signal line 64 are formed in the another process. The signal line 64 and the scan line 62 are formed on different planes. As shown in FIG. 3, the gate electrode 90 and the source electrode 94 are separated by an insulating layer 91 and a semiconductor layer 92. The thin film transistor 70 is connected to the pixel electrode 72 via the source contact hole 86, and the redundant conductive line 66 is connected to the thin film transistor 70 and the signal line 64 respectively through the drain contact hole 85 and the signal contact hole 82.

Figure 4A:
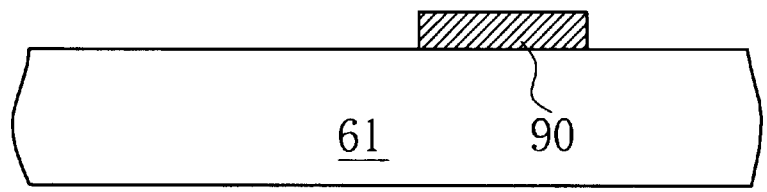
FIGS. 4A to 4E are the cross-sectional views of the method for fabricating the TFT-LCD in the present invention.

Please refer to FIG. 4A to 4E which illustrate the fabricating process of the TFT-LCD 60 in the present invention. The method of the present invention is primarily applied to the fabrication of a twist-nematic (TN) mode TFT-LCD. As shown in FIG. 4A, the TFT-LCD 60 is formed on a glass substrate 61. First of all, a first metal layer is deposited over the surface of the glass substrate 61, and then patterned to form a gate electrode 90 and a scan line (not shown) on the glass substrate 61 by a first photo-etching process (PEP-1). The gate electrode 90 is connected to the scan line.

Figure 4B:
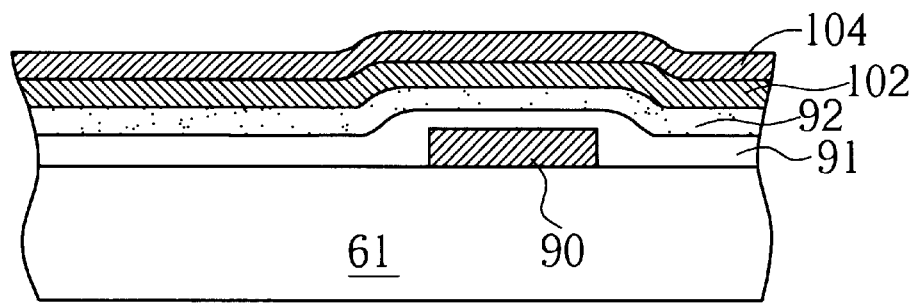

As shown in FIG. 4B, an insulating layer 91, a semiconductor layer 92, a doped silicon layer 102, and a second metal layer 104 are formed, respectively, on the glass substrate 61. The semiconductor layer 92 is made of polysilicon or amorphous silicon, depending on the conditions of manufacturing process or display area, etc. Then, patterning the semiconductor layer 92, the doped silicon layer 102, and the second metal layer 104 by a second process (PEP-2) for forming an island structure of the thin-film transistor.

Figure 4C:
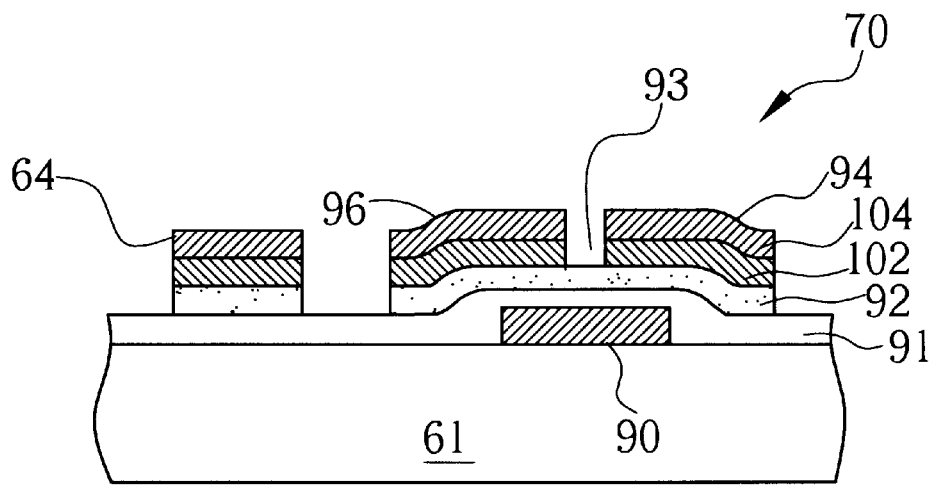
Figure 4D:
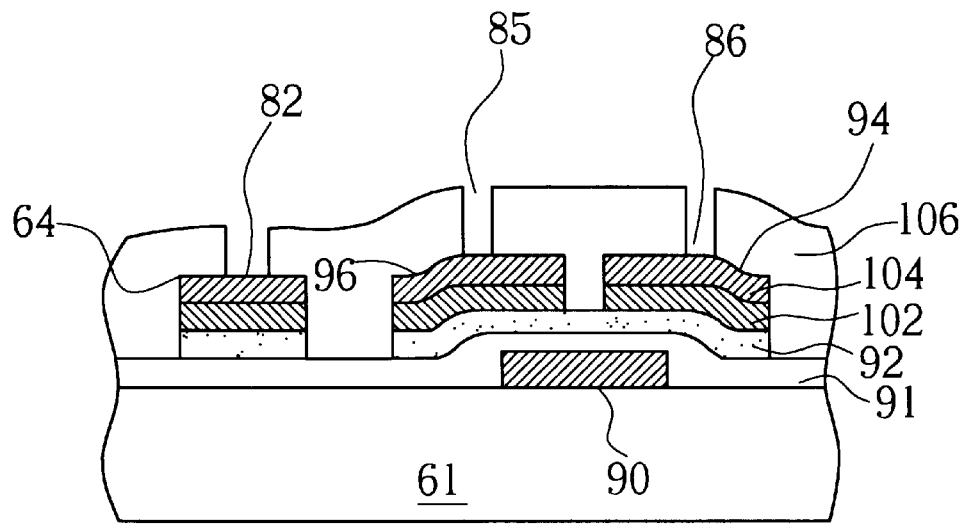
Figure 4E:
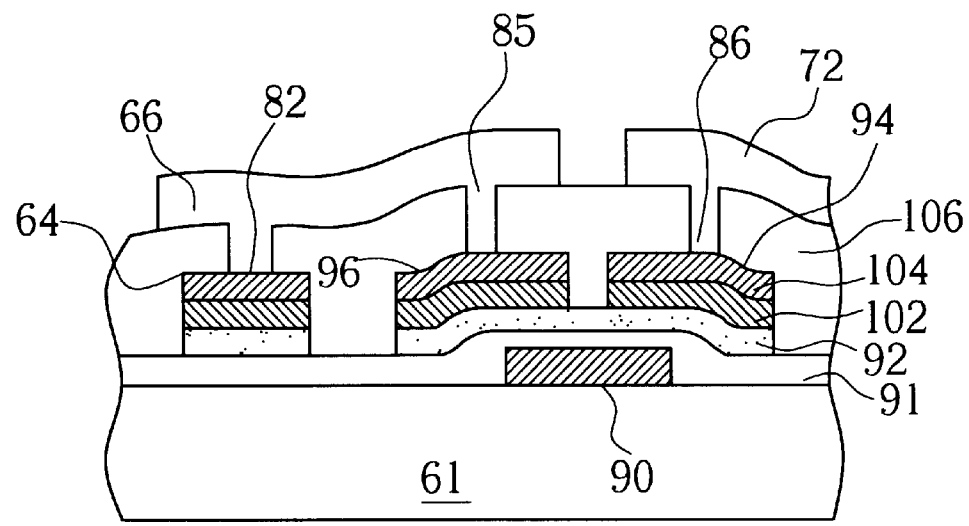

As shown in FIG. 4C, patterning the second metal layer 104 and in the doped silicon layer 102 by a third process (PEP-3) to form a scan line 62, a source electrode 94, and a drain electrode 96 of the thin-film transistor 70. Then, as shown in FIG. 4D, a passivation layer 106 is formed on the glass substrate 61 to cover the thin film transistor 70 and the scan line 64. Next, a fourth process (PEP-4) is used to form several contact holes in the passivation layer 106. For example, a source contact hole 86 is formed above the source electrode 94, a drain contact hole 85 is formed above the drain electrode 96, and a signal line contact hole 82 is formed above the signal line 64, respectively. As shown in FIG. 4E, a transparent conductive layer is deposited on the glass substrate 61. The transparent conductive layer is made of ITO layer and also fill. Into these contact holes 86, 85 and 82. A fifth process (PEP-5) in used to pattern the transparent layer for simultaneously forming a redundant conduct line pattern and a pixel electrode pattern 72. The redundant conductive line pattern is formed only at the crossing region of the signal line 64 and the scan line (not shown).

In contrast to the prior art, the TFT-LCD is manufacturing by five photo-etching processes in the present invention. The TFT-LCD of the present invention has a redundant localized conductive line only at the crossing region of the signal line and the scan line. The redundant conductive line electrically connects with the signal line and the thin film transistor via the signal contact hole and the drain contact hole, respectively. The redundant conductive line and the pixel electrode are formed in the same process. Thus, the present invention not only solves the defect problem caused by the particle contamination, but also improves the production yield. Moreover, the present invention can be used to avoid the short circuit occurred on the signal line of the TFT-LCD.

Those skilled in the art will readily observe that numerous modification and alterations of the advice may be made while retaining the teachings of the invention. Accordingly, the above disclosure should be construed as limited only by the metes and bounds of the appended claims.

What is claimed is:

1. A method of fabricating a thin film transistor liquid crystal display (TFT-LCD), the method comprising the steps of:

providing a substrate, the TFT being formed on the substrate, the substrate further comprising a scan line and a signal line perpendicular to the scan line, the scan line and the signal line being positioned on two different surfaces;

forming a passivation layer over the substrate for covering the TFT and the signal line;

patterning the passivation layer to form at least one signal line contact hole above the signal line;

forming a transparent conductive layer above the passivation layer, the transparent conductive layer tilling into the signal line contact hole; and patterning the transparent conductive layer for allowing the transparent conductive layer remaining above a crossing region of the signal line and the scan line.

2. The method of claim 1 wherein the signal line contact hole is positioned at either sides of the crossing region of the signal line and the scan line.

3. The method of claim 1 wherein the transparent conductive layer is made of indium tin oxide (ITO).

4. A method of forming a thin film transistor flat panel display with a thin film transistor, the method comprising:

providing a substrate;

depositing a first metal layer on the substrate;

patterning the first metal layer to form a gate electrode and a scan line by a first photo-etching process (PEP);

depositing an insulating layer to cover the surface of the first metal layer;

sequentially depositing a semiconductor layer, a doped silicon layer, and a second metal layer on the substrate and patterning the semiconductor layer, the doped silicon layer, and the second metal layer for forming an island structure of the thin film transistor by a second PEP;

patterning the second metal layer and the doped silicon layer to form a drain/source electrode and a signal line by performing a third PEP;

forming on the substrate a passivation layer for covering the thin film transistor and the signal line;

performing a fourth PEP and forming at least a signal line contact hole in the passivation layer above the signal line;

forming a transparent conductive layer above the passivation layer, and the transparent conductive layer filling into the signal line contact hole; and patterning the transparent conductive layer by a fifth PEP, the transparent layer being positioned above an crossing region of the signal line and the scan line.

5. The method of claim 4 wherein the semiconductor layer is composed of amorphous silicon or polysilicon.

6. The method of claim 4 wherein the transparent conductive layer is made of indium tin oxide (ITO).

7. The method of claim 4 wherein the signal line contact hole is positioned at either sides of the crossing region of the signal line and the scan line.

8. The method of claim 4 wherein the transparent layer is located only at the crossing region of the signal line and the scan line.

* * * * *